Oct. 14, 1947.  R. GROETCHEN  2,429,022
GAS BURNER WITH SUPERIMPOSED BAFFLE
Filed Nov. 29, 1943
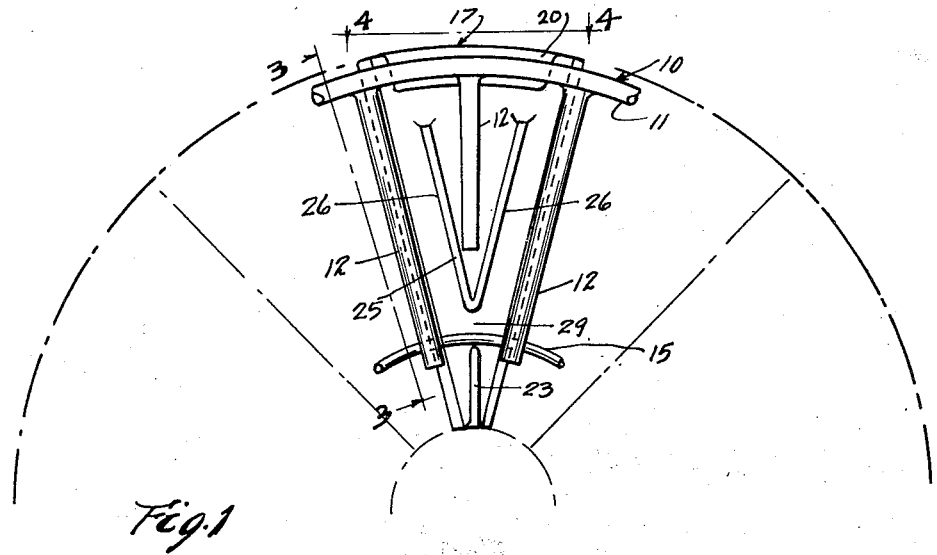
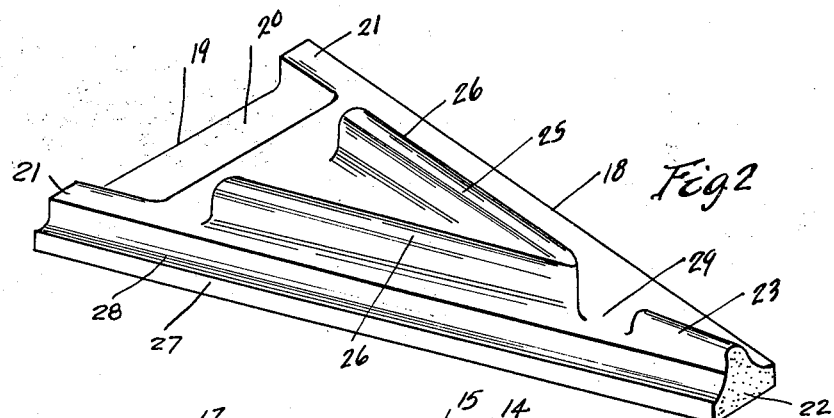
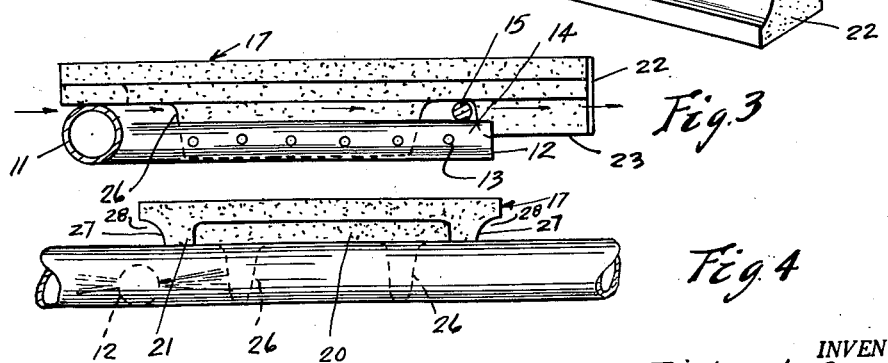
INVENTOR.
Richard Groetchen
BY
His Attorney Patented Oct. 14, 1947

2,429,022

UNITED STATES PATENT OFFICE 2,429,022

GAS BURNER WITH SUPERIMPOSED BAFFLE

Richard Groetchen, Chicago, Ill.

Application November 29, 1943, Serial No. 512,157

1 Claim. (Cl. 158—113)

This invention relates to certain novel improvements in heat radiating devices and one especially adapted for use in connection with a cooker such as is disclosed in my companion application filed on even date hereof, and has for its principal object the provision of an improved structure of this character which will be highly efficient in use and economical in manufacture.

The present invention constitutes an improvement of that shown and described in my pending application, Serial No. 451,263, filed July 17, 1942, for Letters Patent on a Burner structure now matured into Patent No. 2,375,412 dated May 8, 1945.

The present invention has for its principal object the provision of a cover for a burner structure in which the cover is provided with elongated heat radiating portions adapted to be disposed in spaced parallel relation with respect to perforated conduit burner arms whereby the flame from the burner arms will uniformly contact with these portions over their complete area, thus resulting in a quicker and more efficient heat radiation.

In the structures with which I am familiar, I have found by experimentation that if the radiating plate is so formed as to provide conductor surfaces or portions unevenly spaced from the burner element, there is considerable delay in the heat radiating element performing its function and that the same is not heated uniformly throughout its flame-engaging surface. The present invention has among its salient objects a structure which will overcome these disadvantageous features.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a fragmentary plan view of the heat radiating device embodying the present invention when viewed from the underside thereof;

Fig. 2 is an inverted perspective view of one of the heat radiating plates embodied in my invention;

Fig. 3 is a side view of the same taken substantially on line 3—3 of Fig. 1; and Fig. 4 is a detail view taken substantially on line 4—4 of Fig. 1.

The drawings illustrate the preferred form of construction of my invention. The several objects of the invention are accomplished by the following described structure.

The burner structure is indicated at 10, and this preferably and in the instant case comprises a circular supply conduit 11. Extending inwardly radially from this supply conduit are burner arms 12. These burner arms are perforated on opposite sides as at 13. Secured to the inner end-portions 14 of these burner arms is a supporting ring 15.

The cover for the burner structure is indicated at 17. This cover comprises a plurality of ceramic plates 18 each preferably substantially triangular in plan view. The outer ends 19 of these plates 18 provide a cut-out portion 20 between flat ribs 21. The apex end portion 22 of each plate provides a short projection 23 spaced from a medial portion 25 formed substantially V-shaped to provide opposite converging ribs 26. These ribs 26 are spaced inwardly from the opposite side edges 27 of the plate 18. These side edges 27 are provided with a quarter round cove 28.

As shown, each plate is positioned on the burner structure with the ribs 21 resting upon the supply conduit 11 and with the supporting ring 15 positioned on the space 29 provided between the depending portion 23 and the medial portion 25. In this position each plate is supported by the burner structure with portions thereof to provide an unobstructed air passage as shown by the arrows in Fig. 3. In this position of each plate upon the burner structure, the ribs 26 will be disposed between adjacent burner arms 14 in parallel spaced relation with respect to such arms. In this position of the ribs 26, such ribs receive a uniform full blast of the flame emitting from the burner arms 12, whereby the complete area of the ribs 26 is uniformly heated, and consequently these ribs 26 will uniformly conduct the heat to the main body of the plate 18, likewise in a uniform manner.

Thus, each plate 18 is heated to its capacity in the shortest possible time and will radiate the heat uniformly throughout its entire surface.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modification as come within the scope of the appended claim.

Having thus described my invention, what I claim as new and desire to protect by Letters Patent is:

A heat radiating device comprising a substantially circular burner structure having radially extending perforated conduit arms dividing the burner structure into a plurality of segmental spaces, a cover for said burner structure comprising a plurality of segmental radiating plates each including a depending portion substantially V-shaped in plan view and extending between and in spaced parallel relation with respect to the conduit arms, said plates having portions thereof spaced from said burner structure to provide unobstructed air passages between said plates and said burner structure, and conduit arms carried by said supply conduit and extending into the V-shaped space provided by said depending portions.

RICHARD GROETCHEN.

REFERENCES CITED

The following references are of record in the file of this patent:

UNITED STATES PATENTS

| Number | Name | Date |
|---|---|---|
| 1,379,538 | De Silva | May 24, 1921 |
| 1,797,102 | Rossi | Mar. 17, 1931 |
| 2,040,147 | McKee | May 12, 1936 |
| 2,052,067 | Zeimet | Aug. 25, 1936 |
| 2,070,111 | Blayney | Feb. 9, 1937 |
| 2,219,787 | Parker | Oct. 29, 1940 |

FOREIGN PATENTS

| Number | Country | Date |
|---|---|---|
| 754,561 | France | Nov. 9, 1933 |